US008531923B2

(12) United States Patent
Mons

(10) Patent No.: US 8,531,923 B2
(45) Date of Patent: Sep. 10, 2013

(54) METHOD FOR STORING AUDIO-CENTERED INFORMATION WITH A MULTI-LEVEL TABLE-OF-CONTENTS (TOC) MECHANISM WITH ONE MASTER-TOC AND SUB-TOCS FOR VARIOUS AUDIO FORMATS, A DEVICE FOR USE WITH SUCH MECHANISM AND A UNITARY STORAGE MEDIUM CONTAINING SUCH MECHANISM

(75) Inventor: Johannes J. Mons, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 75 days.

(21) Appl. No.: 13/302,381

(22) Filed: Nov. 22, 2011

(65) Prior Publication Data

US 2012/0063280 A1 Mar. 15, 2012

Related U.S. Application Data

(63) Continuation of application No. 09/341,910, filed as application No. PCT/IB98/01868 on Nov. 24, 1998, now Pat. No. 8,085,624.

(30) Foreign Application Priority Data

Nov. 29, 1997 (EP) .................................. 97203745

(51) Int. Cl.
*G11B 20/12* (2006.01)
(52) U.S. Cl.
USPC .................................. 369/30.04; 369/59.25

(58) Field of Classification Search
USPC ....................................................... 369/30.04
See application file for complete search history.

(56) References Cited

U.S. PATENT DOCUMENTS

| | | | |
|---|---|---|---|
| 4,001,883 A | 1/1977 | Strout et al. | |
| 4,996,678 A | 2/1991 | Maeda | |
| 5,200,944 A | 4/1993 | Souma | |
| 5,384,674 A | 1/1995 | Nishida et al. | |
| 5,475,668 A | 12/1995 | Azumatani et al. | |
| 5,596,565 A | 1/1997 | Yonemitssu et al. | |
| 5,608,715 A * | 3/1997 | Yokogawa et al. | 369/275.1 |
| 5,623,470 A | 4/1997 | Asthana et al. | |
| 5,734,787 A | 3/1998 | Yonemitsu et al. | |
| 5,737,639 A | 4/1998 | Ohmori | |
| 5,940,853 A | 8/1999 | Ooi et al. | |

(Continued)

FOREIGN PATENT DOCUMENTS

| | | |
|---|---|---|
| EP | 0402973 A1 | 12/1990 |
| EP | 0487331 A2 | 5/1992 |

(Continued)

OTHER PUBLICATIONS

JJ. van der Kam, "A Digital Decimating Filter for Analog-to-Digital Conversion fo Hi-Fi Audio Signals" Philips Tech. Rev. 42. No. 6/7, pp. 230-238, Apr. 1986.

(Continued)

*Primary Examiner* — Adam R Giesy

(57) ABSTRACT

Audio information is stored on a unitary storage medium with a Table-of-Contents (TOC) mechanism for therein specifying an actual configuration of various audio items on the medium. In particular, one or more Sub-TOCs are each assigned to a respective different audio format. A single Master-TOC is provided for specifically pointing to each Sub-TOC.

14 Claims, 4 Drawing Sheets

(56) References Cited

U.S. PATENT DOCUMENTS

| | | | |
|---|---|---|---|
| 6,151,442 | A | 11/2000 | Ueno et al. |
| 6,298,025 | B1 | 10/2001 | McPherson et al. |
| 6,370,090 | B1 | 4/2002 | Verbakel et al. |

FOREIGN PATENT DOCUMENTS

| | | | |
|---|---|---|---|
| EP | 0613144 A2 | 8/1994 |
| EP | 0640960 A2 | 3/1995 |
| EP | 0676761 A1 | 10/1995 |
| EP | 0709843 A2 | 5/1996 |
| EP | 0777227 A1 | 6/1997 |
| EP | 0817195 A2 | 1/1998 |
| JP | 5151760 A | 6/1993 |
| JP | 7262696 A | 10/1995 |
| JP | 9259539 A | 10/1997 |
| JP | 9288884 A | 11/1997 |
| WO | 9511508 A1 | 4/1995 |
| WO | 9619807 A2 | 6/1996 |
| WO | 9701156 A1 | 1/1997 |
| WO | 9816014 A1 | 4/1998 |
| WO | 9820488 A2 | 4/1998 |

OTHER PUBLICATIONS

Kirk C.H. Chao et al, "A Higher Order Topology for Interpolative Modulators for Oversampling A/D Converters", IEEE Transactions on Circuits and Systems, vol. 37, No. 3, Mar. 1990, pp. 309-318.

Anonymous, "Variable Transport Speed Recording", Research Disclosure No. 36411, Aug. 1994, pp. 412-413.

\* cited by examiner

```
                              # bytes          format
Master_TOC ( ) {
    Master_TOC_0 ( )          2048            Master_TOC_0
    for (c=1; c<=8; c++)
    {
        Master_Text [c]       2048            Master_Text
    }
    Manuf_Info( )             2048            Manuf_Info
}
```

FIG. 7

```
                              # bytes          format           value
Master_TOC_0 ( ) {
    M_TOC_0_Header ( )        16              M_TOC_0_Header
    Album_Info ( )            48              Album_Info
    Disc_Info ( )             64              Disc_Info
    Text_Channels ( )         40              Text_Channels
    Reserved                  until 2048      Uint8            0
}
```

FIG. 8

```
                              # bytes          format           value
Disc_Info () {
    2CH_TOC_1_Address         4               Uint32
    2CH_TOC_2_Address         4               Uint32
    MC_TOC_1_Address          4               Uint32
    MC_TOC_2_Address          4               Uint32
    Disc_Flags ()             1               Disc_Flags
    Reserved                  3               Uint8            0
    2CH_TOC_Len               2               Uint16
    MC_TOC_Len                2               Uint16
    Disc_Catalog_Number       16              String
    Disc_Genre ()             16              Genre4
    Disc_Date                 4               Date
    Reserved                  4               Uint8            0
    /*** Disc text files are in Master_Text [c] with c=1..8 ***/
}
```

FIG. 9

METHOD FOR STORING AUDIO-CENTERED INFORMATION WITH A MULTI-LEVEL TABLE-OF-CONTENTS (TOC) MECHANISM WITH ONE MASTER-TOC AND SUB-TOCS FOR VARIOUS AUDIO FORMATS, A DEVICE FOR USE WITH SUCH MECHANISM AND A UNITARY STORAGE MEDIUM CONTAINING SUCH MECHANISM

This is a continuation of prior application Ser. No. 09/341,910 filed Jul. 20, 1999 and is incorporated by reference herein.

FIELD OF THE INVENTION

The invention relates to digital audio storage on unitary media such as disc or tape.

Use of such storage is at present widespread. In case of sub-division of the audio into multiple sub-items, a Table-of-Contents (TOC) allows access to the information in a relatively fast manner. Generally, a TOC specifies at least what has been stored and where it has been stored. However, audio storage is defined according to multiple standardized audio formats, such as two-channel stereo, multiple (5-6) channel audio such as for use in surround sound applications, and possibly others. An audio provider may wish to combine various different such formats on a single medium such as an optical disc, and as a consequence, a user would want to be able to access various audio items in a fast and easy manner.

Those skilled in the art are directed to the following references:

LIST OF RELATED DOCUMENTS (D1) Research Disclosure number 36411,
August 1994, page 412-413
(D2) PCT/IB97/01156 (PHN 16.452)
1 bit ADC and lossless compression of audio
(D3) PCT/IB97/01303 (PHN 16.405)
Audio compressor
(D4) EP-A 402,973 (PHN 13.241)
Audio compression
(D5) "A digital decimating filter for analog-to-digital conversion of hi-fi audio signals", by J. J. van der Kam in Philips Techn. Rev. 42, no. 6/7, April 1986, pp. 230-8
(D6) "A higher order topology for interpolative modulators for oversampling A/D converters", by Kirk C. H. Chao et al in IEEE Trans. on Circuits and Systems, Vol 37, no. 3, March 1990, pp. 309-18.

The above references are hereby incorporated in whole by reference.

SUMMARY OF THE INVENTION

It is an object of the invention to allow the audio management system to discriminate between the various formats, and to navigate among the various items of only a single format, so that it will not be necessary to change an actual decoder strategy.

The invention also relates to a unitary storage medium produced by the method, and to a reader or player arranged for interfacing with such storage medium. One or more of the audio formats could effectively be a dummy, but for reasons of standardizing, the multilevel TOC arrangement also needs to be changed.

BRIEF DESCRIPTION OF THE DRAWINGS

These and further aspects and advantages of the invention will be discussed more in detail hereinafter with reference to the disclosure of preferred embodiments, and in particular with reference to the appended Figures that show:

FIG. 7 shows Table 1 which specifies a Master_TOC Syntax;
FIG. 8 shows Table 2 which specifies a Master_TOC_O Syntax;
FIG. 9 shows Table 3 which specifies a Disc_Info Syntax.

DETAILED DESCRIPTION OF THE INVENTION

Figure 1A:
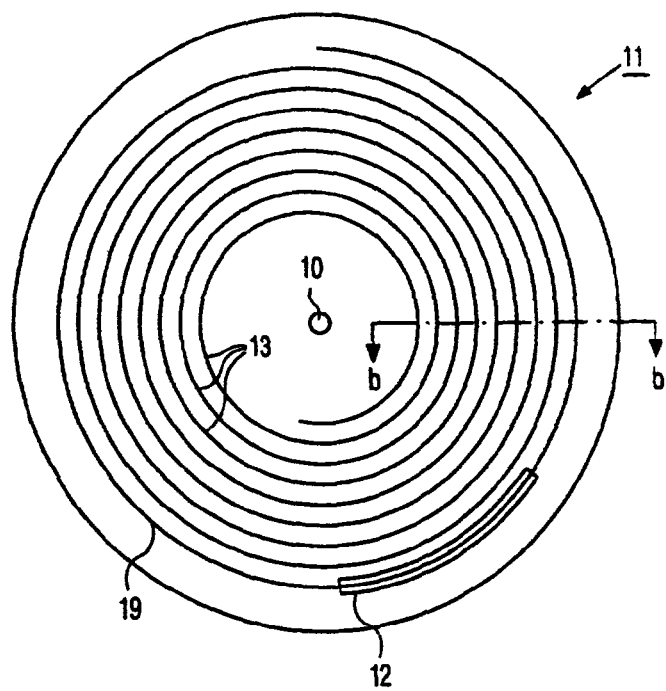
FIGS. 1a, 1b a record carrier,
FIG. 2 a playback device,
FIG. 3 a recording device,
FIG. 4, a file system for use with the invention.

FIG. 1a shows a disc-shaped record carrier 11 with track 19 and central hole 10. Track 19 is arranged in a spiral pattern of turns forming substantially parallel tracks on an information layer. The carrier may be an optical disc with a recordable or a prerecorded information layer. Examples of a recordable disc are CD-R, CD-RW, and DVD-RAM, whereas audio CD is a prerecorded disc. Prerecorded discs can be manufactured by first recording a master disc and later pressing consumer discs. Track 19 on the recordable record carrier is indicated by a providing a pre-embossed track structure during manufacture of the blank record carrier. The track may be configured as a pregroove 14 to enable a read/write head to follow the track 19 during scanning. The information is recorded on the information layer by optically detectable marks along the track, e.g. pits and lands.

Figure 1B:
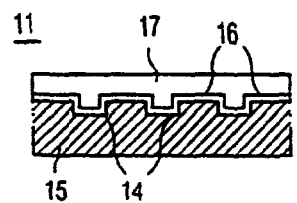

FIG. 1b is a cross-section along the line b-b of a recordable record carrier 11, wherein transparent substrate 15 carries recording layer 16 and protective layer 17. The pregroove 14 may be implemented as an indentation, an elevation, or as a material property deviating from its surroundings.

For user convenience, the audio information on the record carrier has been subdivided into items, which usually have a duration of a few minutes e.g. songs on an album or movements of a symphony. Usually the record carrier also contains access information for identifying the items, such as in a so-called Table Of Contents (TOC), or included in a file system like ISO 9660 for CD-ROM. The access information may include playing time and start address for each item, and also further information like a song title.

The audio information is recorded in digital representation after analog to digital (A/D) conversion. Examples of A/D conversion are PCM 16-bit per sample at 44.1 kHz known from CD audio and 1 bit Sigma Delta modulation at a high oversampling rate e.g. 64×Fs called bitstream. The latter method represents a high quality encoding method, with a choice between high quality decoding and low quality decoding, the latter allowing a simpler decoding circuit. Reference is made in this respect to documents D5 and D6 infra. After A/D conversion, digital audio is compressed to variable bitrate audio data for recording on the information layer. The compressed audio data is read from the record carrier at such a speed, that after decompression substantially the original timescale will be restored when reproducing the audio information continuously. Hence the compressed data must be retrieved from the record carrier at a speed dependent on the varying bitrate. The data is retrieved from the record carrier at so-called transfer speed, i.e. the speed of transferring data bytes from the record carrier to a de-compressor. The record carrier may have uniform spatial data density, which gives the highest data storage capacity per unit of area. In such system the transfer speed is proportional to the relative linear speed between the medium and the read/write head. If before the de-compressor a buffer has been provided, actual transfer speed is the speed before that buffer.

Figure 2:
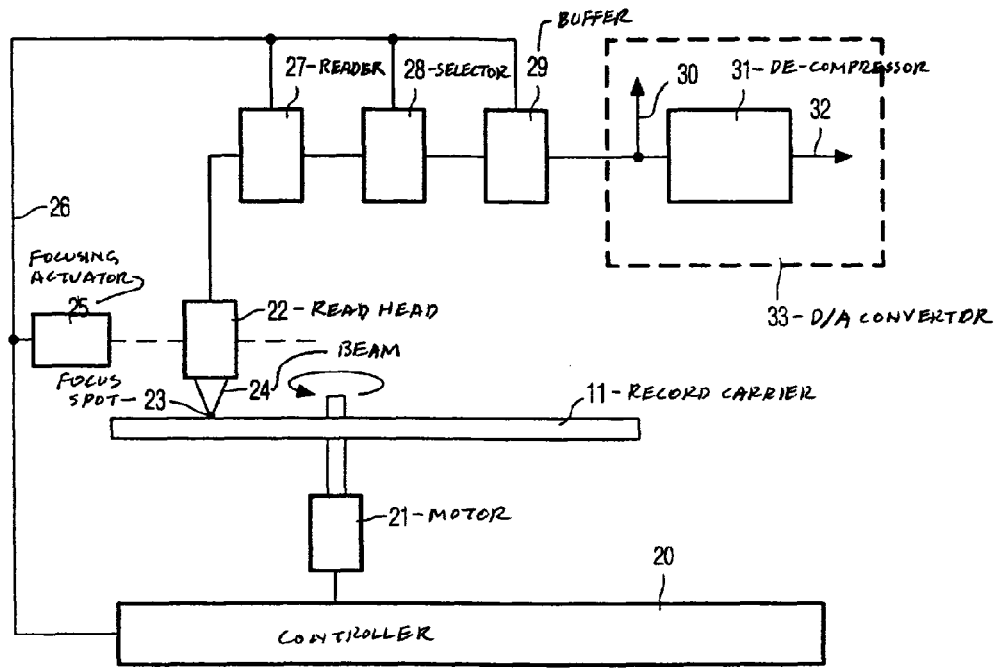

FIG. 2 shows a playback apparatus according to the invention for reading a record carrier 11 of the type shown in FIG. 1. The device has drive means 21 for rotating record carrier 11 and a read head 22 for scanning the record carrier track. Positioning means effect 25 coarse radial positioning of read head 22. The read head comprises a known optical system with a radiation source for generating a beam 24 that is guided through optical elements and focused to spot 23 on an information layer track. The read head further comprises a focusing actuator for moving the focus of the radiation 24 along the optical axis of the beam and a tracking actuator for fine positioning of spot 23 in a radial direction on the centre of the track. The tracking actuator may comprise coils for moving an optical element or may be arranged for changing the angle of a reflecting element. The radiation reflected by the information layer is detected by a known detector in the read head 22, e.g. a four-quadrant diode, to generate a read signal and further detector signals including a tracking error and focusing error signals for the tracking and focusing actuators, respectively. The read signal is processed by a reading means 27 to retrieve the data, which reading means are of a usual type for example comprising a channel decoder and an error corrector. The retrieved data is passed to a data selection means 28, to select the compressed audio data for passing on to buffer 29. The selection is based on data type indicators also recorded on the record carrier, e.g. headers in a framed format. From buffer 29, the compressed audio data are passed on to de-compressor 31 as signal 30. This signal may also be outputted to an external de-compressor. De-compressor 31 decodes the compressed audio data to reproduce the original audio information on output 32. The de-compressor may be fitted in a stand-alone high quality audio D/A convertor 33. Alternatively, the buffer may be positioned before the data selections means. The buffer 29 may be positioned in a separate housing or may be combined with a buffer in the decompressor. The device furthermore has a control unit 20 for receiving control commands from a user or from a host computer not shown, that via control lines 26 such as a system bus is connected to drive means 21, positioning means 25, reading means 27 and data selection means 28, and possibly also to buffer 29 for buffer filling level control. To this end, the control unit 20 may comprise control circuitry, such as a microprocessor, a program memory and control gates, for performing the procedures described below. Control unit 20 may be implemented as a logic circuit state machine.

The art of audio compression and de-compression is known. Audio may be compressed after digitizing by analyzing the correlation in the signal, and producing parameters for fragments of a specified size. During de-compression the inverse process reconstructs the original signal. If the original digitized signal is reconstructed exactly, the (de-)compression is lossless, whereas lossy (de)-compression will not reproduce certain details of the original signal which however are substantially undetectable by the human ear or eye. Most known systems for audio and video, such as DCC or MPEG, use lossy compression, whereas lossless compression is used for storing computer data. Examples of audio compression and decompression can be found in D2, D3 and D4 hereinafter, of which in particular the lossless compression from D2 is suitable for high quality audio.

According to the invention, data selection means 28 are arranged to retrieve from the read data certain control information. The data selection means 28 are also arranged to discard any stuffing data, that had been added during recording. When the control unit 20 is commanded to reproduce an item of audio from the record carrier, the positioning means 25 are controlled to position the reading head on the portion of the track containing the TOC. The starting address for that item will then be retrieved from the TOC via the data selection means 28. Alternatively the contents of the TOC may be read only once and stored in a memory when the disc is inserted in the apparatus. For reproducing the item the drive means 21 are controlled to rotate the record carrier at an appropriate rotary velocity, to be derived from timing indications stored with the audio. The radial position of the item can be calculated as based on the starting address, because the record carrier density parameters like track pitch and bit length, are predetermined and known to the playback device, usually from a standard. Subsequently the rotation rate can be derived from the bitrate and the radial position.

To provide continuous reproduction without buffer underflow or overflow the transfer speed is coupled to the reproduction speed of the D/A converter, i.e. to the bitrate after decompression. To this end the apparatus may comprise a reference frequency source for controlling the decompressor and the rotation rate may be set in dependence on the reference frequency and the speed profile. Alternatively or additionally the rotation rate may be adjusted using the average filling level of buffer 29, e.g. decreasing the rotation rate when the buffer is more than 50% full on average.

Figure 3:
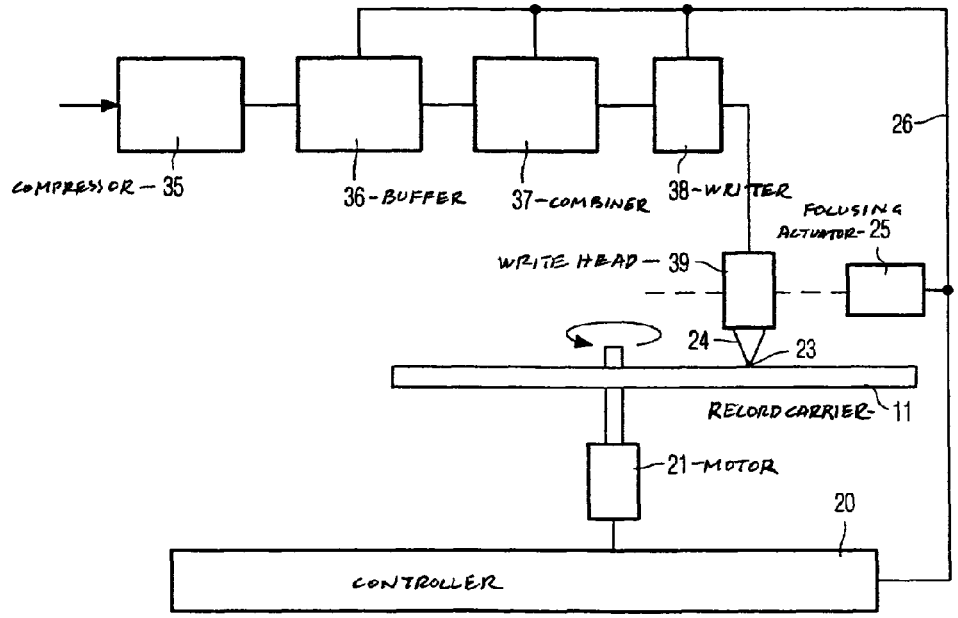

FIG. 3 shows a recording device according to the invention for writing information on a (re)writable record carrier 11. During a writing operation, marks representing the information are formed on the record carrier. The marks may be in any optically readable form, e.g. in the form of areas whose reflection coefficient differs from their surroundings, by recording in materials such as dye, alloy or phase change, or in the form of areas with a direction of magnetization different from their surroundings when recording in magneto-optical material. Writing and reading of information for recording on optical disks and usable rules for formatting, error correcting and channel coding, are well-known, e.g. from the CD system. Marks may be formed through a spot 23 generated on the recording layer via a beam 24 of electromagnetic radiation, usually from a laser diode. The recording device comprises similar basic elements as described with reference to FIG. 2, i.e. a control unit 20, drive means 21 and positioning means 25, but it has a distinctive write head 39. Audio information is presented on the input of compression means 35, which may be placed in a separate housing. Suitable compression has been described in D2, D3 and D4. The variable bitrate compressed audio on the output of the compression means 35 is passed to buffer 36. From buffer 36 the data is passed to data combination means 37 for adding stuffing data and further control data. The total data stream is passed to writing means 38 for recording. Write head 39 is coupled to the writing means 38, which comprise for example a formatter, an error encoder and a channel encoder. The data presented to the input of writing means 38 is distributed over logical and physical sectors according to formatting and encoding rules and converted into a write signal for the write head 39. Unit 20 is arranged for controlling buffer 36, data combination means 37 and writing means 38 via control lines 26 and for performing the positioning procedure as described above for the reading apparatus. Alternatively the recording apparatus may be arranged for reading having the features of the playback apparatus and a combined write/read head.

Figure 4:
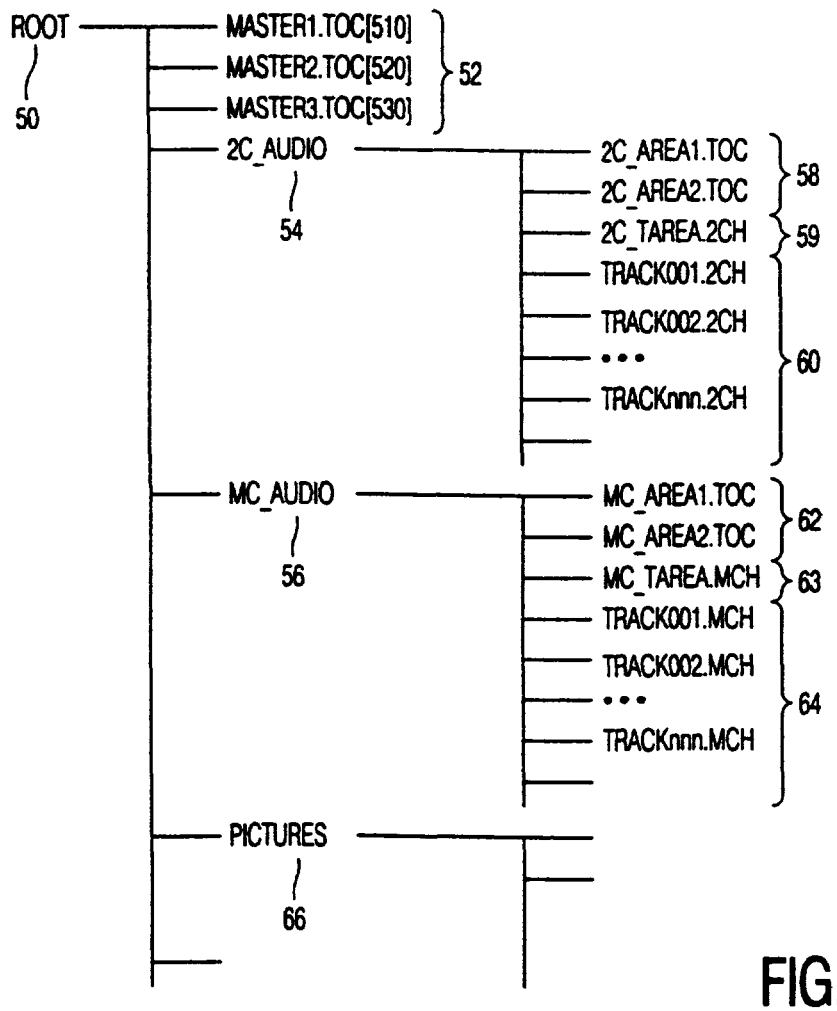

FIG. 4 shows a file system for use with the invention, for which various different options are feasible. As main choices the inventors have proposed that the storage medium should be based on either the UDF file system or the ISO 9660 file system, or both, which systems are standard to the skilled art person. In the alternative case, no file system would be present at all and the relevant sector spaces should be kept empty.

If a the system is present however, all audio will be stored in Audio Files, that are located in SubDirectory SCD_AUDIO. As shown in FIG. 4, the hierarchy is based on ROOT file 50 that points to various subaltern files 52, 54, 56, 66 as shown. The structure of MASTER.TOC 52 will be discussed hereinafter. Furthermore, there is a 2C_AUDIO file 54. This points to TOC 2C_AREA.TOC 58 and in parallel therewith to the various stereo tracks TRACKn.2CH 60. Furthermore, there is MC_AUDIO file 56. This points to TOC MC_AREA.TOC 62 and in parallel therewith to the various stereo tracks TRACKn.MCH 64. For reasons of safety, the MASTER.TOC has been provided in three contiguously positioned copies MASTER1.3.TOC52. Likewise for reasons of safety, the subaltern TOCs have been provided in two copies 2C_AREA1,2.TOC 58 and MC_AREA1,2.TOC.62, respectively. These two copies are positioned before and behind, respectively, the associated audio. As a further feature, the audio formats have an additional overall the each, 2C_TAREA.2CH 59 and MC_TAREA.MCH that contain the file information of all associated track files, respectively. Finally, a picture file 66 has been provided that may be related to a similar organization as has been provided for the audio.

Figure 5:
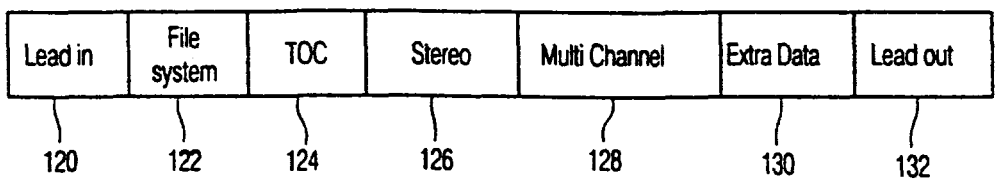
FIG. 5, a first storage arrangement for the invention.

FIG. 5 shows a first storage arrangement for use with the invention, which for example has been mapped on a single serial track. Along the horizontal axis the following items are evident. Item 120 is a Lead-in area that is used for mutually synchronizing the reader and the driving of the medium. Item 122 represents the File System that has been disclosed with reference to FIG. 4. Item 124 represents a TOC that may be configured according to standard procedures and pertains to subsequent items Stereo Audio Item 126 and Multi-channel Audio Item 128, and if necessary also to Extra Data Item 130. The length of item 124 need not be standardized, inasmuch as various different amounts of information may be present. Item 126 represents Stereo Audio Information, that may be defined according to a conventional standard and by itself does not constitute part of the invention. Item 128 represents Multi Channel Audio Information, that may be defined according to a conventional standard and by itself does not constitute part of the invention. Generally, the two audio areas may have the same structure and contain the same kinds of information, apart from the distinguishing definitions of the various channels. The audio may be plain coded or lossless coded. All kinds of audio may be multiplexed with supplementary data such as Compact Disc Text.

Item 130 represents Extra Data Information that may be defined in a conventional standard and by itself does not form part of the invention. Item 132 represents a Lead-Out Information. The latter item is used in particular during search operations. The number of lead-out tracks may be large enough to cover a ring of some 0.5 to 1 millimeter wide. According to the above, the stored information may either be accessed via the file system as laid down in item 122, or via the TOC structure laid down in item 124, and more particular, via a two- or multi-level TOC structure.

Figure 6:
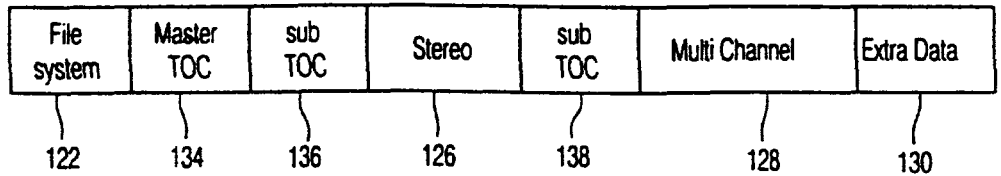
FIG. 6, a second storage arrangement for the invention.

FIG. 6 shows a second storage arrangement for use with the invention, pertaining to a two-level TOC structure. Along the horizontal axis the following items are evident, next to items that have already been shown in FIG. 5 and carry the same reference numerals. For clarity, items 120 and 132 have been suppressed.

Master TOC 134 begins at a uniformly standardized offset position with respect to the start of the Lead-in area at byte number 510. According to the embodiment, the Master-TOC measures only one standard-size sector and primarily contains pointers to the various Sub-TOCs or Area-TOCs. A preferred syntax of the Master-TOC has a header with a Signature that identifies the Master-TOC, such as by "SACD Master TOC". Referring to FIGS. 7 and 8, Tables 1 and 2 specify the precise syntax of the MASTER_TOC. The syntax has been given in elementary computer notation, together with the associated lengths and formats. Master_TOC_Signature is an 8 byte string identifying the Master TOC. The value of Master_TOC_Signature must be "SACDMTOC" ($53 $41 $43 $44 $4D $54 $4F $43).

Referring to FIG. 9, Table 3 specifies the disc info syntax in the same manner. In particular:

2CH_TOC_1_Address is a 5 byte integer containing the logical sector number (LSN) of the first sector of Area TOC-1 in the 2 Channel Stereo Area. If the 2-Channel Stereo Area is not present, the value of 2CH_TOC_1_Address must be zero.

2CH-TOC_2_Address is a 4 byte integer containing the LSN of the first sector of Area TOC-2 in the 2 Channel Stereo Area. if the 2-Channel Stereo Area is not present, the value of 2CH_TOC_2_Address must be zero.

MC_TOC_1_Address is a 4 byte integer containing the LSN of the first sector of Area TOC-1 in the Multi Channel Stereo Area. If the Multi Channel Area is not present, the value of MC_TOC_1_Address must be zero.

MC_TOC_2_Address is a 4 byte integer containing the LSN of the first sector of Area TOC-2 in the Multi Channel Stereo Area. If the Multi Channel Area is not present, the value of MC_TOC_2_Address must be zero.

The format of Disc_Flags must be as follows: a hybrid bit and seven reserved bits.

The Hybr bit must be set to one on a Hybrid Disc. The Hybr bit must be set to zero on a not-Hybrid Disc.

The invention claimed is:

1. A method comprising acts of:
providing audio-centered information;
producing a Table-of-Contents (TOC) specifying an actual configuration of various audio items on a unitary medium, including:
  providing two or more sets of one or more Sub-TOCs of a plurality of differently standardized audio formats, and
  providing a single Master-TOC for specifically pointing to each of said Sub-TOCs; and
storing the Master-TOC at a location on the unitary medium and storing at least one set of the two or more sets of Sub-TOCs in a different location on the unitary medium from the location of the Master-TOC.

2. The method as claimed in claim 1, wherein the number of Sub-TOCs is exactly 2.

3. The method as claimed in claim 1, comprising an act of providing said Master-TOC at a standard offset location with respect to an initial location of said unitary medium.

4. The method as claimed in claim 1, wherein said audio formats comprise at least a Stereo audio format and at least one Multi-Channel audio format.

5. The method as claimed in claim 1, comprising an act of providing at least one Extra Data format area on the unitary medium.

6. The method as claimed in claim 1, comprising an act of providing at least two copies of at least one of said TOC and Sub-TOCs.

7. A unitary medium comprising:
audio-centered information;
a Table-of-Contents (TOC) specifying an actual configuration of various audio items on said medium, including:

one or more Sub-TOCs assigned to each of a plurality of differently standardized audio formats; and a single Master-TOC for specifically pointing to each of said Sub-TOCs, wherein at least one of said Sub-TOCs and associated audio-centered information is stored in a different location than the location of the Master-TOC.

8. The unitary medium as claimed in claim 7, wherein the unitary medium is selected from a group consisting of writable CDs, re-writable CDs, DVDs, audio CDs and other optically readable discs.

9. A reader device for interfacing to a medium, the device comprising:

retrieving means for retrieving data stored on the medium;

selecting means for selecting a subset of the retrieved data;

buffering means for buffering the subset of the retrieved data and passing on the buffered data at a pre-selected rate to decompressing and decoding means; and wherein said retrieving means, said selecting means, said buffering means and said decompressing and decoding means are each adapted to handle data stored on the medium, said data including:

audio-centered formation;

a Table-of-Contents (TOC) specifying an actual configuration of various audio items on the medium, including:

one or more Sub-TOCs assigned to each of a plurality of differently standardized audio formats, and a single Master-TOC for specifically pointing to each of said Sub-TOCs, wherein at least one of the Sub-Tocs is in a different location on the medium from the location of the Master-TOC.

10. The device as claimed in claim 9, further comprising:

means for holding the medium;

an optical read head for reading data in a track of the medium; and means for driving a track on the medium under said optical read head.

11. A method for storing audio-centered information on a unitary storage medium while using a non-hierarchical Table-of Contents (TOC) mechanism for therein specifying an actual configuration of audio items on said unitary medium, comprising acts of:

assigning one or more Sub-TOCs to each of a plurality differently standardized audio formats, and furthermore providing a single Master-TOC specifically pointing to each of said Sub-TOCs, and each Sub-TOCs specifying an actual configuration of audio items on said medium for the respective audio format; and storing the Master-TOC at a location on the unitary medium and storing at least one of the Sub-TOCs in different location on the unitary medium from the location of the Master-TOC.

12. A unitary medium having stored thereon audio-centered information and a non-hierarchical Table-Of-Content for therein specifying an actual configuration of audio items on said unitary medium, wherein the Table-Of-Contents comprises:

one or more Sub-TOCs assigned to each of a plurality of differently standardized audio formats, and a single Master-TOC for specifically pointing to each Sub-TOC, and wherein each Sub-TOC specifies an actual configuration of audio items on said unitary medium for the respective audio format assigned thereto, and wherein at least one of Sub-TOCs is stored in a different location on the unitary medium from the location of the Master-TOC.

13. A reader device for interfacing to a unitary medium as claimed in claim 12, comprising:

a read head for scanning the audio centered information stored on the unitary medium, reading means for retrieving data from the scanned information, data selection means for selecting data from the retrieved data, decoding means for decoding the selected data, outputting means for outputting the decoded data and control means adapted for operating said reader device to handle data formatted according to a specific audio format after reading a non-hierarchical Table-of Contents information, wherein the reader device is adapted to handle data formatted according to at least a second, differently standardized audio format, using information stored in a single Master-TOC to read data stored in at least two Sub-TOCs, each corresponding to a different audio format, and each specifying an actual configuration of audio items on said unitary medium for the respective audio format, and wherein at least one of the at least two Sub-TOCs is stored in a different location on the unitary medium from the location of the Master-TOC.

14. A device as claimed in claim 13, wherein said unitary medium is executed as an optically readable disc, the read head is of the optical type, provided with disc hold means and disc drive means for driving a track of the disc along said read head of the optical type.

* * * * *